United States Patent
Casey et al.

(10) Patent No.: US 6,998,828 B2
(45) Date of Patent: Feb. 14, 2006

(54) LOW AUDIBLE NOISE POWER SUPPLY CONTROLLER AND METHOD THEREFOR

(75) Inventors: Charles A. Casey, Providence, RI (US); Daniel Connolly, East Bridgewater, MA (US); Brant Johnson, Concord, MA (US)

(73) Assignee: Semiconductor Components Industries, L.L.C., Phoenix, AZ (US)

( * ) Notice: Subject to any disclaimer, the term of this patent is extended or adjusted under 35 U.S.C. 154(b) by 59 days.

(21) Appl. No.: 10/810,864

(22) Filed: Mar. 29, 2004

(65) Prior Publication Data

US 2005/0212502 A1 Sep. 29, 2005

(51) Int. Cl.
*G05F 1/44* (2006.01)
(52) U.S. Cl. .................................................. 323/284
(58) Field of Classification Search ................ 323/282, 323/284, 224, 225, 271
See application file for complete search history.

(56) References Cited

U.S. PATENT DOCUMENTS

| | | | |
|---|---|---|---|
| 5,481,178 A | 1/1996 | Wilcox et al. | |
| 5,528,132 A | 6/1996 | Doluca | |
| 5,710,697 A | 1/1998 | Cooke et al. | |
| 5,731,731 A | 3/1998 | Wilcox et al. | |
| 5,747,977 A * | 5/1998 | Hwang | 323/284 |
| 5,994,885 A | 11/1999 | Wilcox et al. | |
| 6,166,527 A | 12/2000 | Dwelley et al. | |
| 6,252,783 B1 | 6/2001 | Huh et al. | |
| 6,304,066 B1 | 10/2001 | Wilcox et al. | |
| 6,307,356 B1 | 10/2001 | Dwelley | |
| 6,366,070 B1 | 4/2002 | Cooke et al. | |
| 6,396,252 B1 | 5/2002 | Culpepper et al. | |
| 6,462,525 B1 | 10/2002 | Chen | |
| 6,597,221 B1 | 7/2003 | Hall et al. | |
| 6,917,188 B1 * | 7/2005 | Kernahan | 323/282 |

* cited by examiner

*Primary Examiner*—Gary L Laxton
(74) *Attorney, Agent, or Firm*—Robert F. Hightower (57) ABSTRACT

In one embodiment, a power supply controller of a power supply system uses an algorithm to reduce the number of drive pulses to the output transistors under light load conditions. The algorithm groups the drive pulses to the output transistors into sets and removes some of the drive pulses for each set drive pulses issued by the controller. Each successive set removes additional drive pulses.

20 Claims, 6 Drawing Sheets

LOW AUDIBLE NOISE POWER SUPPLY CONTROLLER AND METHOD THEREFOR

BACKGROUND OF THE INVENTION

The present invention relates, in general, to electronics, and more particularly, to methods of forming semiconductor devices and structure.

In the past, various methods and circuits were utilized to implement switching power supplies. In order to minimize power dissipation, some implementations would switch the power transistor at a lower frequency or may even switch the power transistor on and off in short bursts. One such implementation to minimize power dissipation was disclosed in U.S. Pat. No. 6,252,783 issued to Dong-Young et al on Jun. 26, 2001.

One problem with such implementations was audible noise. When the switching frequency of the power transistor was reduced, it often produced noise in the audible frequency range. The audible noise was often objectionable and became a nuisance to users of the power supply.

Accordingly, it is desirable to have a switching power supply that has reduced power dissipation, and that minimizes audible noise.

BRIEF DESCRIPTION OF THE DRAWINGS

For simplicity and clarity of illustration, elements in the figures are not necessarily to scale, and the same reference numbers in different figures denote the same elements. Additionally, descriptions and details of well-known steps and elements are omitted for simplicity of the description.

DETAILED DESCRIPTION OF THE DRAWINGS

Figure 1:
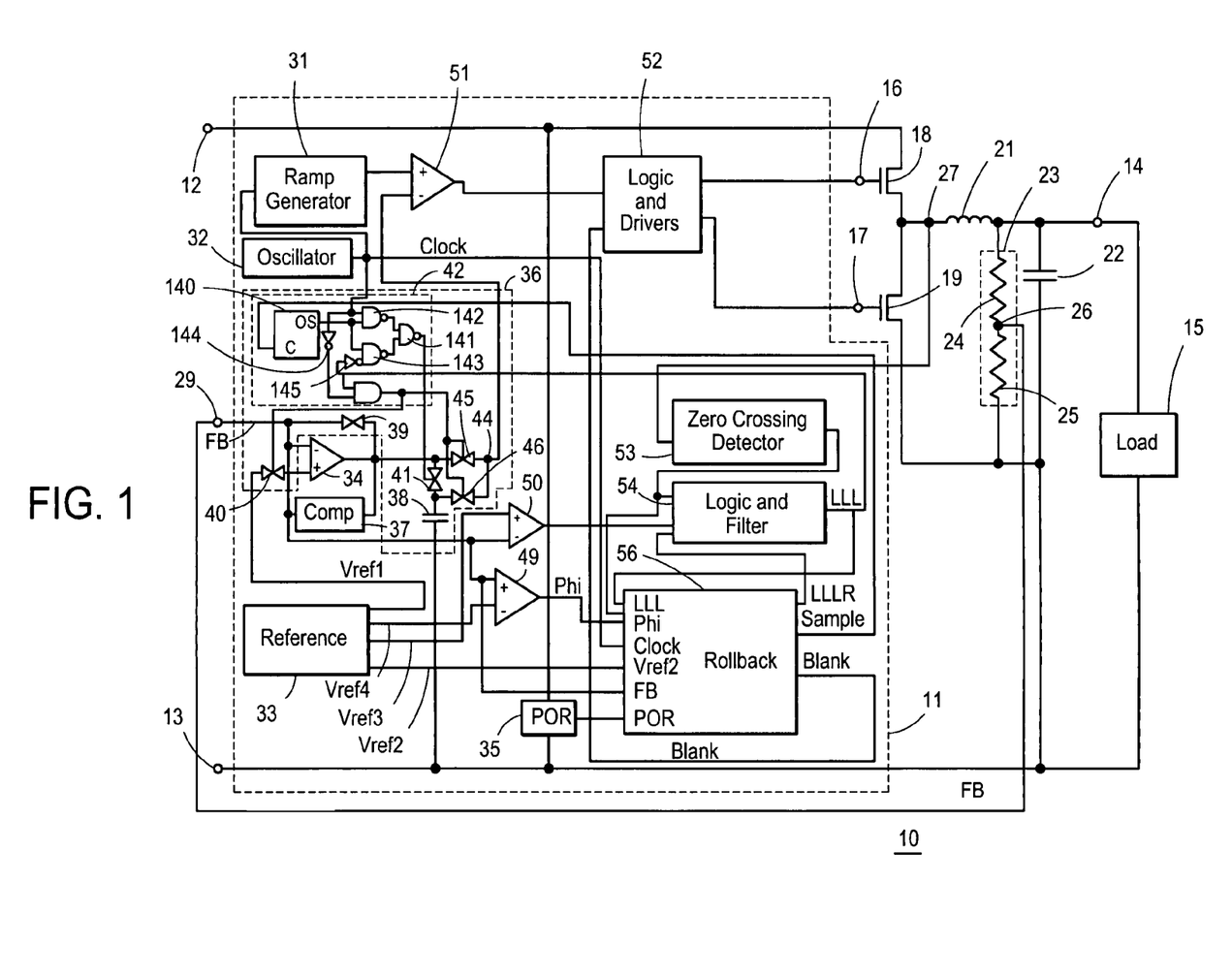
FIG. 1 schematically illustrates a portion of an embodiment of a power supply system in accordance with the present invention.

FIG. 1 schematically illustrates an embodiment of a portion of a power supply system 10 that includes a power supply controller 11 which minimizes audible noise during the operation of both controller 11 and system 10. Controller 11 receives power between a voltage input 12 and a voltage return 13, and system 10 provides an output voltage on an output 14. The voltage applied to input 12 typically is a rectified AC voltage such as a rectified household mains voltage. Other components typically are connected externally to controller 11 in order to provide the desired functionality for system 10. For example, an energy storage inductor 21, an energy storage capacitor 22, an upper output transistor 18, and a lower output transistor 19 typically are connected externally to controller 11. Outputs 16 and 17 of controller 11 are connected to drive transistors 18 and 19, respectively. Transistors 18 and 19 typically are switching power transistors that are connected in series between input 12 and return 13, and have a switch node 27 at the serial connection of transistors 18 and 19. A feedback network 23 that includes feedback resistors 24 and 25 typically is connected externally to controller 11. Resistors 24 and 25 usually are connected serially between output 14 and return 13, and have a feedback node 26 at the serial connection of resistors 24 and 25. A feedback signal (FB) is formed at feedback node 26. Transistors 18 and 19, inductor 21, capacitor 22, and resistors 24 and 25 are shown to assist in describing the operation of controller 11. In most embodiments, network 23, transistors 18 and 19, inductor 21, capacitor 22, and resistors 24 and 25 are external to the semiconductor die on which controller 11 is formed. Typically, a load 15 is connected between output 14 and return 13 to receive a load current from system 10 in addition to the output voltage.

A switching portion of controller 11 provides typical switching power supply operational features that are well known to those skilled in the art. The switching portion includes an oscillator 32 that provides a clock signal (Clock) on an output of oscillator 32, a ramp generator 31 that receives the Clock signal and provides a voltage ramp signal that is utilized to provide switching signals to transistors 18 and 19, a ramp comparator 51, and a logic and drivers block 52 that provides the logic functions of a typical switching power supply controller in addition to drivers that are utilized to drive transistors 18 and 19. Block 52 receives the ramp voltage from generator 31 and drives transistors 18 and 19 with the drive pulses in order to form the output voltage on output 14. Block 52 has outputs connected to outputs 16 and 17 to drive transistors 18 and 19. Those skilled in the art understand that block 52 may include various other well-known components and functions such as under-voltage protection, over-current protection, soft-start, and various other well-known functions.

In addition to the switching portion, controller 11 also includes a sample-and-hold block 36, an error amplifier 34, a zero crossing detector 53, a logic and filter block 54, a power on reset (POR) circuit or power on reset (POR) 35, an over-voltage comparator 49, a rollback control block 56, and a mode-change comparator 50. A reference generator or reference 33 of controller 11 provides four different reference voltages, identified as Vref1, Vref2, Vref3, and Vref4 that are utilized by different portions of controller 11. Controller 11 receives the feedback signal from node 26 on a feedback input 29 of controller 11. Error amplifier 34 receives the feedback signal on an inverting input, receives the Vref1 voltage on a non-inverting input, and responsively generates a varying error voltage on an output of amplifier 34 that is connected to a node 43. A compensation network or COMP 37 may be connected between input 29 and the output of amplifier 34 in order to provide compensation for the feedback signal. Such compensation networks are well known to those skilled in the art. Power-on reset 35 is formed to receive the input voltage from input 12 and responsively provide a power-on reset (POR) signal that indicates the input voltage on input 12 is low and that controller 11 should reset. The POR signal is a logic zero when the input voltage is low.

Controller 11 is formed to operate in two different modes referred to herein as a normal operating mode and a light load mode. In the normal operating mode, the switching portion of controller 11 provides periodic drive pulses to transistors 18 and 19. The drive pulses generally occur at a frequency of the Clock signal generated by oscillator 32. Thus, each cycle of the Clock signal is a time slot in which a drive pulse may occur. In some embodiments, the time slots may be multiple cycles of the Clock signal. Under light load conditions the output current provided to load 15 may become very small. In such a case, it may be desirable to reduce the number of drive pulses to transistors 18 and 19 in order to improve the efficiency of system 10. Controller 11 is formed to detect such a light load condition and change the operating mode of system 10. The light load condition exists when the load current reduces to a first value. In the light load mode, rollback control block 56 prevents logic and drivers block 52 from generating some of the drive pulses to transistors 18 and 19. The omitted drive pulses are selected to minimize the amount of audible noise generated by controller 11. Omitting some of the drive pulses during the light load mode may cause the output voltage to decrease. Controller 11 is formed to reset from the light load mode if the output voltage on output 14 decreases to a value that is detrimental to the operation of load 15. This value is referred to as the mode-change voltage value or mode-change voltage. When the output voltage decreases to the mode-change voltage, the output of comparator 50 goes high indicating that controller 11 should reset from the light load condition and enter the normal operating mode. Thus, the output of comparator 50 functions as a mode-change signal. In order to form the mode-change signal, comparator 50 has a non-inverting input connected to receive the Vref3 signal from reference 33 and has an inverting input connected to input 29 to receive the feedback signal. The Vref3 signal is formed to be representative of the mode-change voltage. The output of comparator 50 is connected to an input of logic and filter block 54.

Zero crossing detector 53 and logic and filter block 54 are formed to detect the light load condition and provide a light load latched (LLL) signal indicating that a light load condition currently exists. Detector 53 generates a zero crossing detected signal each time there is a reversal of current through inductor 21. Detector 53 has an input coupled to switch node 27 in order to detect the zero crossings, and an output that provides the zero crossing detected signal. Each time node 27 goes positive with respect to return 13 while transistor 19 is enabled, detector 53 generates the zero crossing detected signal. Block 52 is formed to drive output 17 low and turn-off transistor 19 when a zero crossing is detected. This operation greatly reduces reverse inductor current. Such zero crossing detectors are well known to those skilled in the art. When block 54 receives a desired number of zero crossing detected signals consecutively without being reset by comparator 50 or block 56, block 54 generates the light load latched (LLL) signal. In the preferred embodiment, logic and filter block 54 receives eight consecutive zero crossing detected signals before generating the LLL signal. The eight consecutive crossings detect that the load current has decreased to the first value and that the light load condition exists. Eight crossings were selected to provide sufficient noise immunity to ensure that the current change being detected is not a transient but is a change in the current required by load 15.

Rollback control block 56 receives the LLL signal and periodically provides a Blank signal on a Blank output that prevents logic and drivers block 52 from generating drive pulses to transistors 18 and 19. Block 56 also receives the Clock signal from oscillator 32, the power-on reset (POR) signal from power-on reset 35, the Vref2 signal on a Vref2 input, and the feedback (FB) signal on a FB input. Block 56 generates the Blank signal, a Sample signal that is used to enable sample-and-hold block 36 to sample the output of amplifier 34, and a light load latched reset (LLLR) signal. The LLLR signal indicates that the light load mode should be reset and that controller 11 should switch to the normal operating mode. Logic and filter block 54 receives the LLLR signal and negates the LLL signal to remove controller 11 and block 56 from operating in the light load mode.

Sample-and-hold block 36 is formed to change the error signal provided to ramp comparator 51 for the two operating modes. During the normal operating mode, sample-and-hold block 36 provides the varying error voltage from the output of amplifier 34 to an error node 44 and to ramp comparator 51 as the error signal. Block 36 also samples the value of the varying error voltage on node 43 and stores the varying error voltage value. During the light load mode, sample-and-hold block 36 provides the sampled error voltage to node 44 and to ramp comparator 51 as the error voltage. Sample-and-hold block 36 includes a storage capacitor 38, a first switch 39, a second switch 40, a third switch 41, a fourth switch 45, a fifth switch 46, a sixth switch 30, and a seventh switch 47 that are used to connect or disconnect the output of amplifier 34 to the input of comparator 51. In the normal operating mode, switches 39, 46, and 47 are open and switches 30, 40, and 45 are closed so that the error voltage on node 43 is connected to the inverting input of comparator 51. Switch 41 is toggled in the normal operating mode on every rising edge of the clock from oscillator 32 for a short time determined by a oneshot 140 in a sample logic block or sample logic 42. This allows the error voltage on node 43 to be stored on capacitor 38. In the light load mode, switches 39, 46 and 47 are closed and switches 30, 40, 41, and 45 are open so that amplifier 34 is disconnected from the input to comparator 51 and so that the sampled error voltage on capacitor 38 is connected to the inverting input of comparator 51. Also in this light load configuration, switch 30 disconnects feedback network 23 from the negative input of error amplifier 34, switch 39 ties error amplifier 34 in unity gain feedback, switch 40 disconnects Vref1 from the positive input of error amplifier 34, and switch 47 ties the input of comparator 51 to the positive input of error amplifier 34. This light load mode configuration of error amplifier 34 minimizes changes in the voltage on node 43. Switches 30, 39, 40, 41, 45, 46, and 47 typically are MOS transmission gates that are well known to those skilled in the art. Sample logic 42 includes one shot 140, NAND gates 141–144, and inverters 145–147. During the light load mode, the LLL signal is a logic one or high. This forces a logic zero or low on the output of inverter 146 and the input of NAND gate 142. The zero on the input of NAND gate 142 forces its output to a high state or a logic one. When the Sample signal is a logic zero or low, the output of inverter 145 is high causing the output of NAND gate 144 low and the output of inverter 147 high. The low Sample signal also causes the output of NAND gate 141 to be high. Since the output of NAND gate 142 is also high, the output of NAND gate 143 is low. When the output of inverter 147 is high, switches 39, 47, and 46 are closed and switches 40, 45, and 30 are open. When the output of NAND gate 143 is low, switch 41 is closed. When the output of inverter 147 is a logic zero or low, switches 39, 47, and 46 are open and switches 40, 45, and 30 are closed. When the Sample signal is low, the sampled error voltage remains a substantially constant value, thus, the duty cycle of the signal on the output of comparator 51 and the duty cycle of the pulses supplied to transistors 18 and 19 remains substantially constant during each set of drive pulses. As will be seen hereinafter, the Sample signal goes high so that the sampled error voltage may be adjusted to more accurately reflect the value of the output voltage on output 14.

When controller 11 is operating in the light load mode, controller 11 implements a drive pulse algorithm to improve the efficiency of system 10 and to substantially eliminate audible noise. As a part of the drive pulse algorithm, block 56 organizes or groups the time slots during which controller 11 will drive transistors 18 and 19 into a group or set that contains a desired number of time slots. Each time slot corresponds to a time slot that the switching portion of controller 11 uses to generate each drive pulse for transistors 18 and 19. This time slot typically corresponds to one cycle of the Clock signal from oscillator 32. As another part of the drive pulse algorithm, during each time slot the Blank signal generated by block 56 is used by block 52 in order to delete or suppress a drive pulse for a particular time slot. If the Blank signal is asserted, controller 11 does not provide a drive pulse to transistors 18 and 19, thus, that drive pulse is deleted or omitted. For each subsequent set of time slots after controller 11 has issued the first set of time slots, block 56 increments the number of Blank signals. Thus, block 56 controls controller 11 to omit or delete additional drive pulses for each successive set of time slots. This sequence of removing an additional drive pulse for each successive set of time slots continues until the output voltage decreases to a rollback value. The rollback value typically is closer to the desired output voltage value than is the mode-change value. Thus, the value of the mode-change voltage is less than the value of the rollback voltage. In the preferred embodiment, the rollback value represents a one percent (1%) decrease in the desired output voltage and the mode-change value represents a three percent (3%) decrease in the desired output voltage. If the output voltage decreases to the rollback value, block 56 rolls back the pulse removal algorithm and re-inserts the last drive pulse that was removed from the previous set of time slots. Note that when the output voltage reduces to the rollback value, block 36 also initiates a re-sample of the error voltage as is explained in more detailed hereinafter. As long as the output voltage is less than or equal to the rollback value (but greater than the mode-change voltage), block 56 continues rolling back the algorithm by re-inserting one previous drive pulse for each successive set of time slots until block 56 has reinserted all but one drive pulse or until the output voltage rises above the rollback value. If the output voltage rises above the rollback value, block 56 continues the algorithm sequence of removing one drive pulse from each successive set of time slots. If the output voltage remains equal to or less than the rollback voltage and block 56 has re-inserted all but one drive pulse, block 56 continues suppressing the one drive pulse until this sequence has repeated a number of times referred to as the repeat number. Once this sequence is repeated a number of times equal to the repeat number, block 56 asserts the LLLR signal which resets block 54 causing the light load latched (LLL) signal to be negated thereby switching controller 11 to the normal operating mode.

As will be seen in more detail hereinafter, whenever the output voltage decreases to or below the rollback value or the mode-change value the Sample signal goes high to allow the error voltage to be adjusted or re-sampled and stored on capacitor 38. While the Sample signal is high, the algorithm is suspended and operation switches to the normal-mode. The algorithm continues from the point of suspension when the Sample signal once again goes low.

Figure 2:
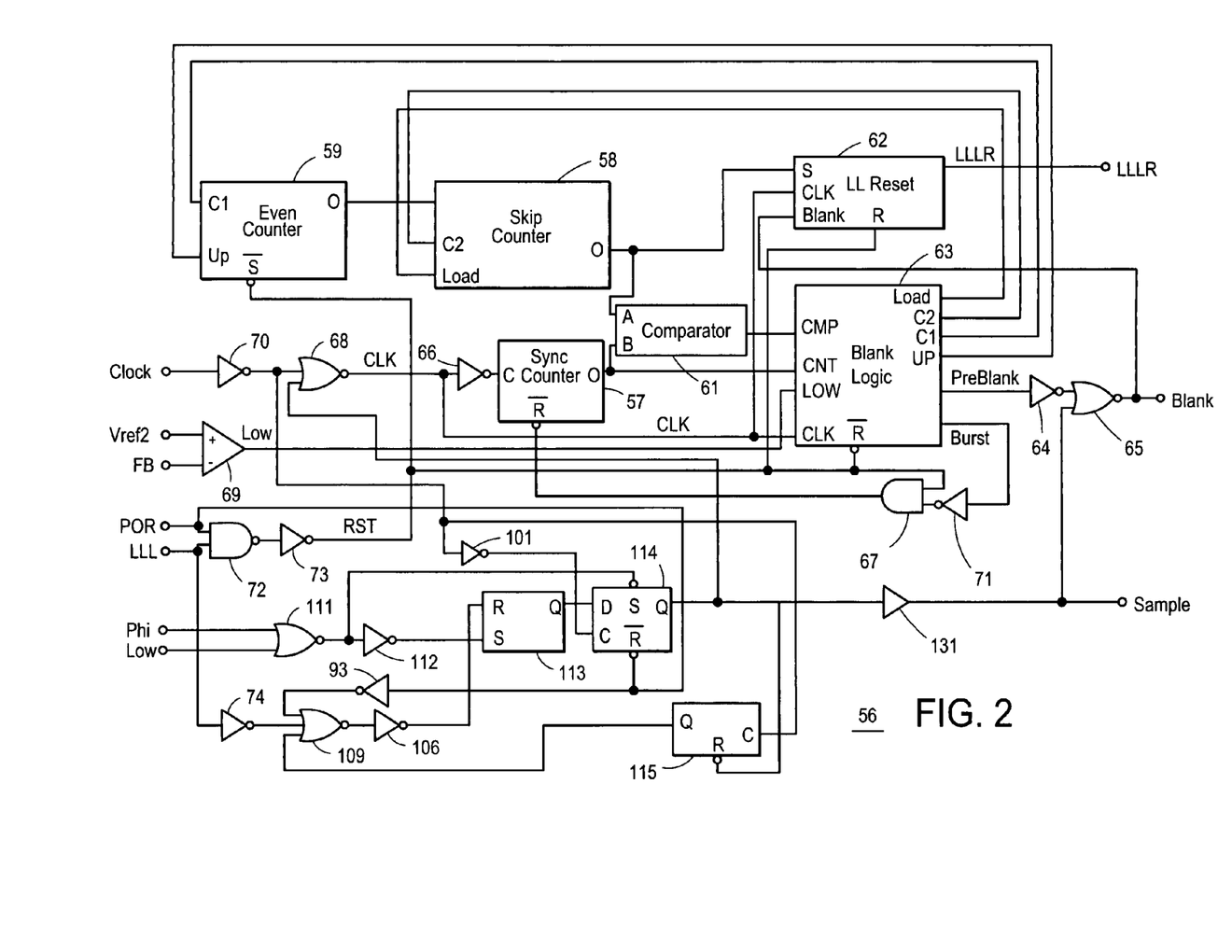
FIG. 2 schematically illustrates an embodiment of a portion of a power supply controller that is a part of the power supply system of FIG. 1 in accordance with the present invention.

FIG. 2 schematically illustrates a preferred functional block diagram embodiment that implements the operational sequence described hereinbefore for block 56. The operational sequence may be implemented by other block diagrams and circuits as long as the described operational sequence is implemented. In this preferred embodiment block 56 groups the time slots into sets of sixteen. Also in this preferred embodiment, block 56 begins removing drive pulses with the sixteenth time slot of the set of sixteen and counts down removing even numbered drive pulses and leaving the odd numbered drive pulses to drive transistors 18 and 19. Removing every other drive pulse leaves some drive pulses spaced over the period represented by the set of time slots thereby minimizing audible noise during the light load mode of controller 11. Further, in the preferred embodiment the repeat number is selected to be three (3) in order to ensure that controller 11 can quickly exit the light load mode and return to the normal operating mode when a current transient occurs.

Block 56 includes a synchronous counter or sync counter 57, an even up/down counter or even counter 59, a skip counter 58, a digital comparator 61, a light load (LL) reset or LL reset block 62, a blank logic block 63, and a sample control block 110. Sync counter 57 is a synchronous four (4) bit rollover counter that is used to group the time slots into the set of sixteen (16). Sync counter 57 receives an inverted clock signal from an output of an inverter 66 and continuously counts from zero to 15 on the negative edge of the Clock signal, which corresponds to the negative edge of the CLK signal, to form the set of sixteen. All other storage elements of block 56, including those of block 63, operate on the positive edge of the Clock signal, which corresponds to the positive edge of the CLK signal. The outputs of counter 57 are a four (4) bit signal representing the state of the four elements within counter 57. The outputs of counter 57 are connected to four CNT inputs of block 63 and to four B inputs of comparator 61. Even counter 59 and skip counter 58 are used to identify the specific time slots of the sixteen time slots from which the drive pulses will be deleted. Counter 59 is a four (4) bit synchronous even up/down counter that counts only by even numbers. Counter 59 receives a clock signal from blank logic block 63 on a clock one (C1) input of counter 59. Counter 59 also receives an Up control input from block 63 that controls the up or down counting direction of counter 59. The outputs of counter 59 are a four bit output that represents the state of the counter elements within counter 59. Skip counter 58 is a four (4) bit parallel loadable even only up counter that also counts by even numbers. Skip counter 58 has four parallel inputs (I) that receive the four outputs of counter 59. Counter 58 has four parallel outputs (O) that represent the state of the counter elements within counter 58. Counter 58 has a clock two (C2) input and a load control input (Load) that are connected to corresponding outputs of block 63. The C2 and Load signals are generated by blank logic block 63. Comparator 61 is a digital comparator that has two sets of four bit parallel inputs. A first set of four parallel inputs (A) receives the outputs from skip counter 58 and a second set of four parallel inputs (B) receives the outputs from synchronous counter 57. Comparator 61 has four parallel outputs (O) that are received by four CMP inputs of block 63. The outputs of comparator 61 are all ones when the inputs are equal, and the outputs are different for other input values.

Figure 3:
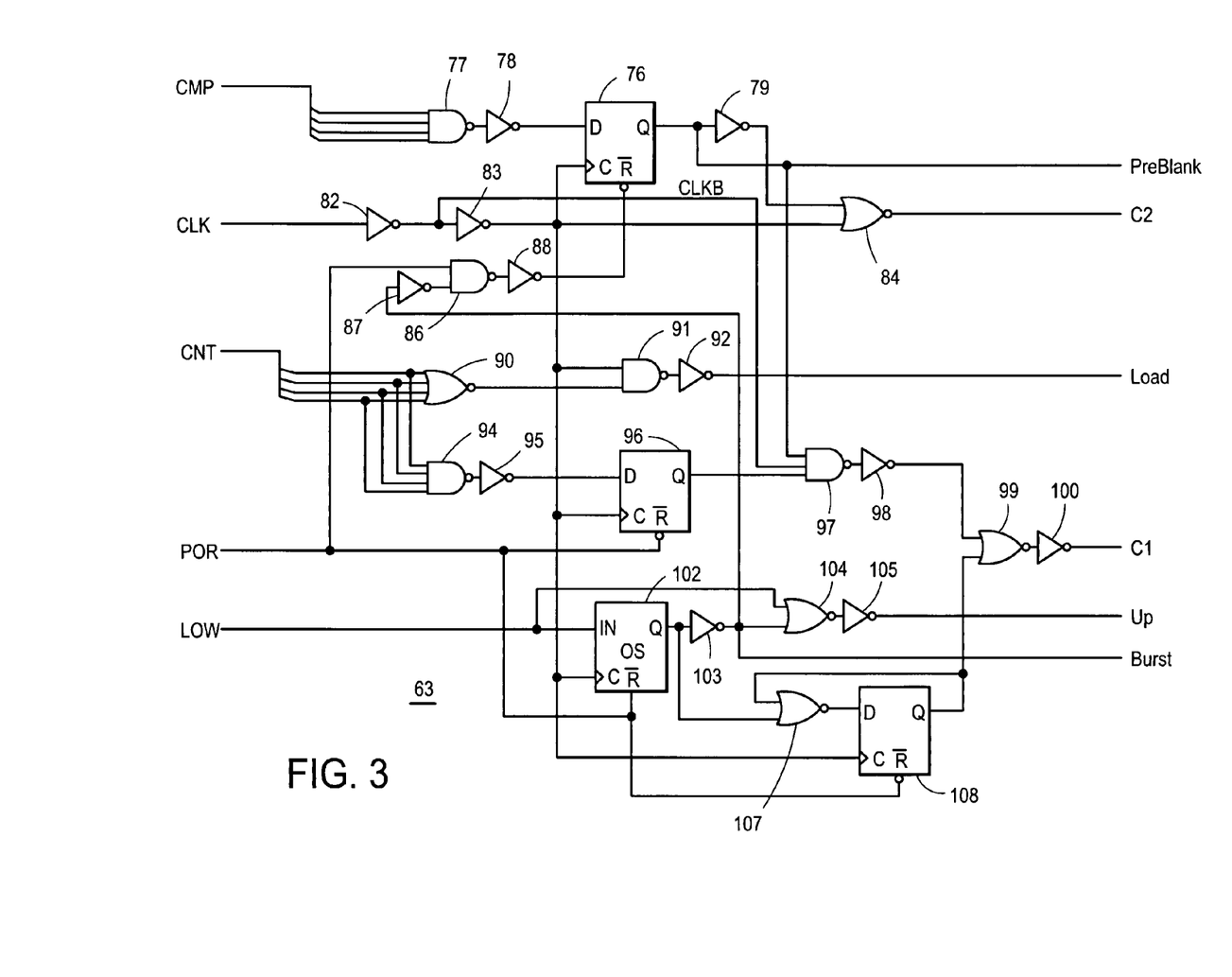
FIG. 3 schematically illustrates an embodiment of a portion of the power supply controller of FIG. 2 in accordance with the present invention.

FIG. 3 schematically illustrates a preferred functional block diagram embodiment of blank logic block 63 that assists in implementing the operation of controller 11 described in the description of FIG. 1 and FIG. 2. The operational sequence may be implemented by other block diagram embodiments as long as the described operational sequence is implemented.

Figure 4:
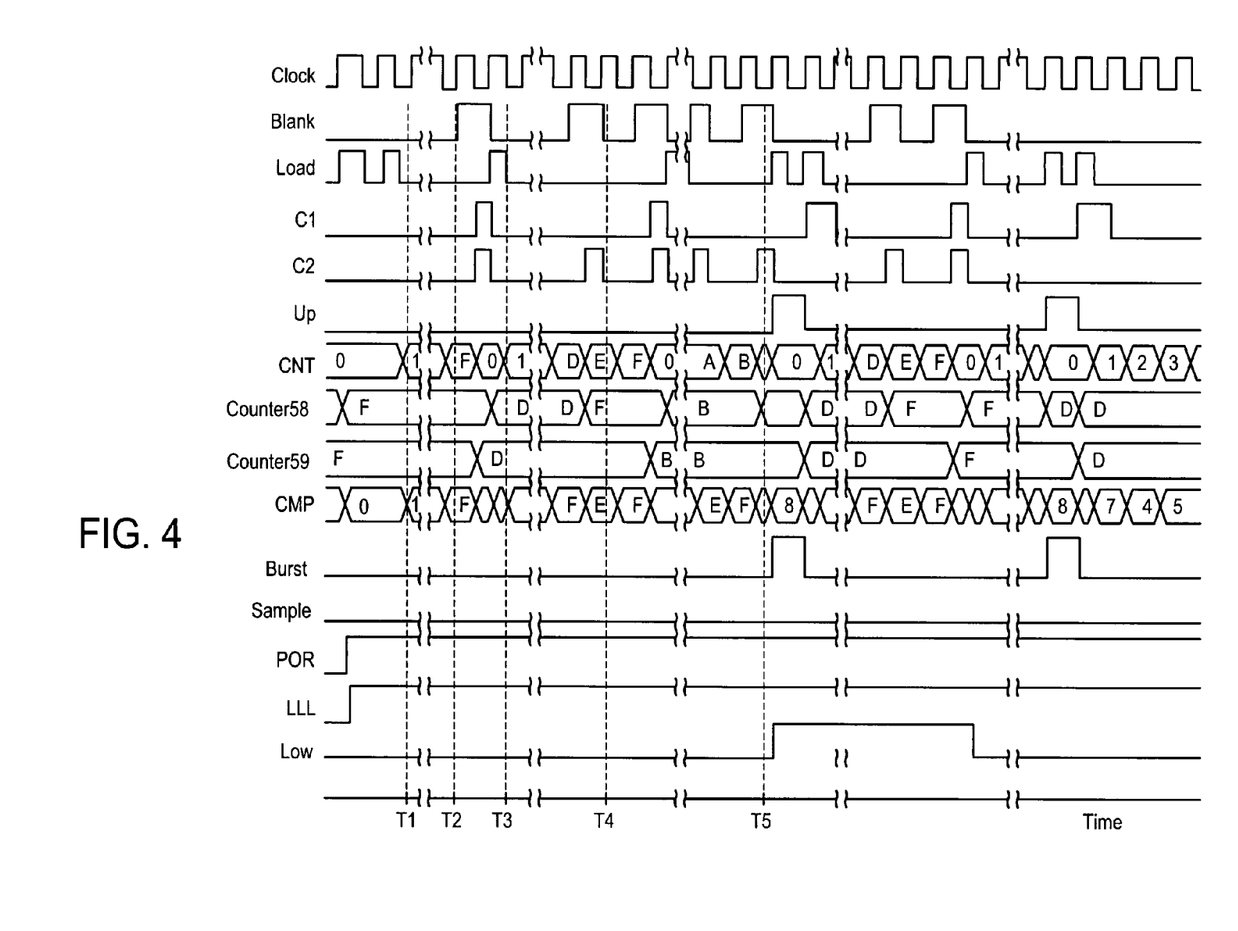
FIG. 4 is a graph illustrating timing diagrams for a portion of the signals and operation sequence of the power supply controller of FIG. 2 in accordance with the present invention.
Figure 5:
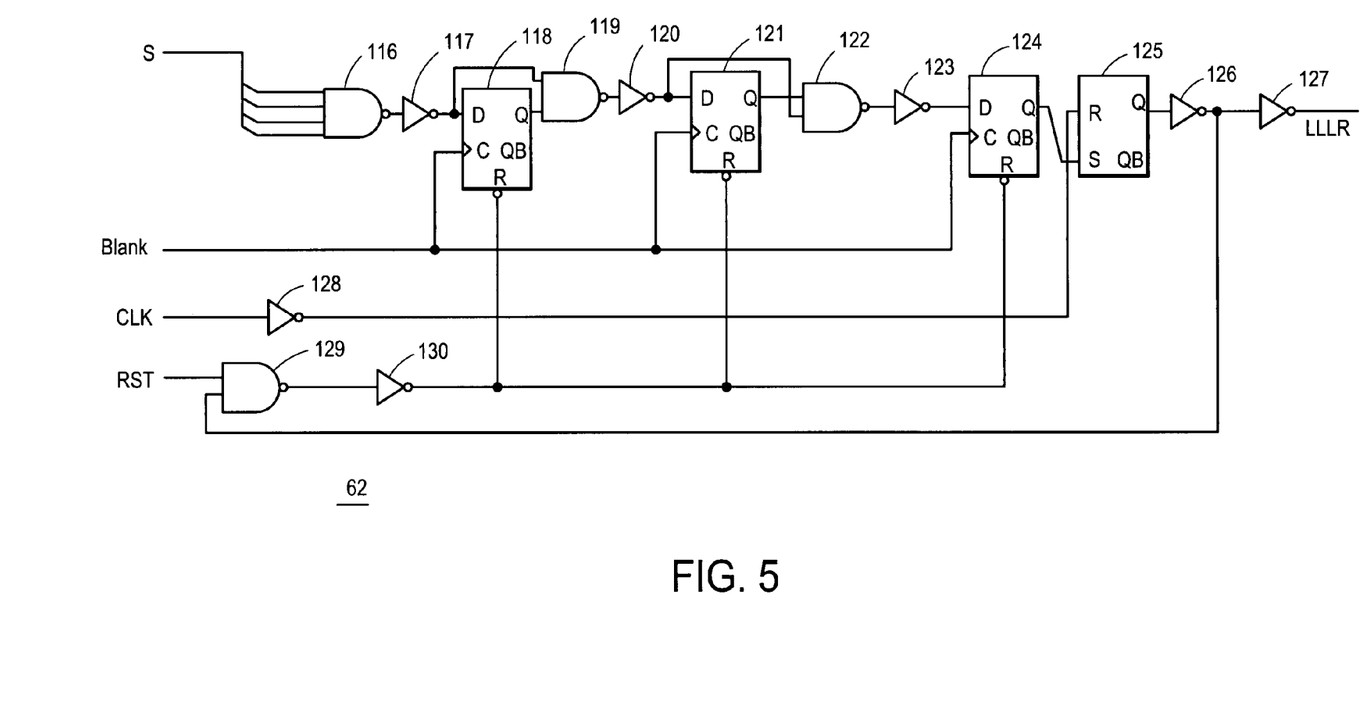
FIG. 5 schematically illustrates an embodiment of another portion of the power supply controller of FIG. 2 in accordance with the present invention.

FIG. 4 is a graph illustrating timing diagrams for a portion of the signals and operation sequence of the embodiments illustrated in FIG. 2, FIG. 3, and FIG. 5. The following operational description will have references to FIG. 1, FIG. 2, FIG. 3, and FIG. 4. When controller 11 is operating in the normal operational mode, the light load latched (LLL) signal is low and the power on reset (POR) signal is high. A NAND gate 72 (FIG. 2) receives the LLL and POR signals and responsively drive the output of gate 72 high. An inverter 73 has an input connected to the output of gate 72 and drives a reset (RST) signal low to set counter 59 to a count of fifteen. A reset (R) input of block 63 and block 62 also receive the RST signal. The RST signal prevents counter 59 from counting and prevents block 63 from generating clock pulses to counters 58 and 59. The RST signal, through an AND gate 67, also prevents counter 57 from counting. POR being high also resets a one-shot 102 forcing the Up and Burst signals low, a D flip-flop 76 forcing the Pre-Blank signal low, and a D flip-flop 96 and a D flip-flop 108 forcing the Cl signal low.

When controller 11 begins operating in the light load mode, the LLL signal goes high driving the output of gate 72 low and releasing counter 59, counter 57, block 62, and block 63. Counter 57 is reset to a value of zero (all zeroes) and counter 59 is set to a count of fifteen (all ones). The all zero outputs of counter 57 drive the CNT inputs of block 63 low. Since counters 57 and 59 contain different values, the CMP inputs of block 63 are not all ones. A NOR gate 90 receives the CNT inputs and applies a logic one to a NAND gate 91. As shown at a time T1, the next positive edge of the CLK signal causes block 63 to responsively generate a Load signal through gate 91 and an inverter 92. The positive going Load signal loads the all ones from the output of counter 59 into counter 58. The next negative edge of the CLK signal increments counter 57, through inverter 66, from zero to one. Since CNT is no longer all zero and the CLK signal is low, block 63 responsively drives the Load signal low.

Each negative edge of the CLK signal increments counter 57 until counters 57 and 58 are both equal. Counter 58 was loaded with a count of fifteen (all ones), thus, when counter 57 is incremented by the negative edge of CLK to a count of fifteen at a time T2 the outputs of counters 57 and 58 are equal and the outputs of comparator 61 go high and drive the CMP inputs of block 63 high. The count of fifteen also drives the CNT inputs of block 63 high. The high CMP inputs are received by a NAND gate 77 and an inverter 78 that apply a logical one to an input of D flip-flop 76. Since counter 57 operates on the negative edge of CLK, the next positive edge of the CLK signal clocks the logic one from inverter 78 into flip-flop 76 causing block 63 to responsively generate a high PreBlank signal. Since the Sample signal is low, the high PreBlank signal generates a high on the Blank output through inverter 64 and NOR gate 65 (See FIG. 2). The high Blank signal causes block 52 to delete the sixteenth drive pulse from this set of sixteen time slots. The highs on the CNT inputs also cause the positive edge of CLK to set D flip-flop 96 high and drive the C1 clock to counter 59 high through gate 94, an inverter 95, a NAND gate 97, an inverter 98, a NOR gate 99, and an inverter 100. The Low signal applied to the Low input of block 63 is a logic zero causing one-shot 102 to generate a low output. However, counter 59 is already at a count of fifteen so it can't count higher and counter 59 remains at a count of fifteen. Since the output of inverter 103 is low and the Low signal is low, the UP signal is low through a NOR gate 104, and an inverter 105. Because the UP signal is logic zero, the C1 clock signal causes counter 59 to countdown from fifteen to thirteen. The PreBlank signal also drives the C2 clock signal high through inverter 79 and a NOR gate 84.

On the next negative edge of CLK, counter 57 counts to a zero which applies zeros to the CNT inputs and causes comparator 61 to apply zeros to the CMP inputs of block 63. The logic lows applied to the CNT inputs cause block 63 to assert the Load signal through gates 90 and 91, and inverter 92. The next positive edge of CLK clocks a low into flop 76 which drives PreBlank low, and clocks a zero into flop 96 which resets C1. The low PreBlank also drives the Blank signal low.

Counter 58 now has a value of thirteen. On the next falling edge of the CLK signal at a time T3, sync counter 57 increments from zero to one. Counter 57 continues to increment until it reaches a count equal to the count of thirteen stored in counter 58. When the outputs of counter 57 and 58 are equal (count of thirteen), comparator 61 applies logic ones to the CMP inputs. Gate 77 and inverter 78 apply a logic one to flop 76. The next rising edge of the CLK signal drives the PreBlank and Blank signals high to delete the fourteenth drive pulse from this set of sixteen time slots. The rising edge of the CLK signal also propagates through gate 84 to generate a C2 clock to increment counter 58 from thirteen to a count of fifteen. The next negative edge of CLK increments counter 57 to a count of fourteen and comparator 61 applies logic lows to the CMP inputs. The next positive edge of CLK drives the PreBlank and Blank signals low allowing block 52 to generate a drive pulse to transistors 18 and 19.

At a time T4, the next falling CLK edge increments counter 57 to a count of fifteen. The outputs of counters 57 and 58 are equal and the outputs of comparator 61 go high and drive the CMP inputs of block 63 high. The count of fifteen also drives the CNT inputs of block 63 high. The high CMP inputs are received by NAND gate 77 and inverter 78 which apply a logical one to D flip-flop 76. Since counter 57 operates on the negative edge of CLK, the next positive edge of the CLK signal clocks the logic one from inverter 78 into flip-flop 76 causing block 63 to responsively generate high PreBlank and Blank signals. The high Blank signal causes block 52 to delete the sixteenth drive pulse from this set of sixteen time slots. The highs on the CNT inputs also cause the positive edge of CLK to set D flip-flop 96 high and drive the C1 clock to counter 59 high. The Low signal applied to the Low input of block 63 is a logic zero which generates a logic zero Up signal through an inverter 103, a NOR gate 104, and an inverter 105. Because the UP signal is logic zero, the C1 clock signal causes counter 59 to countdown from thirteen to eleven. The high CNT inputs also force the Load signal high causing the level sensitive load input to load the count of eleven into counter 58. The PreBlank signal also drives the C2 clock signal high through gate 84 which increments counter 58.

This sequence of removing drive pulses when counters 57 and 58 are equal, incrementing counter 58 by two, decrementing counter 59 by two at the end of the set of sixteen time slots, loading the new count from counter 59 into counter 58 and starting a new set of sixteen time slots continues to repeat until either the output voltage decreases to a value equal to or less than the mode-change value and comparator 50 causes block 54 to drive the LLL signal low or until the output voltage decreases to a value equal to or less than the rollback value or until block 56 generates a low LLLR signal from LL reset block 62.

When the output voltage drops below the rollback value, block 56 rolls back the drive pulse algorithm and re-inserts one drive pulse for each set of drive pulses until all but one drive pulse is re-inserted. A re-sample of the error voltage is also initiated. Vref2 is formed to be representative of the feedback voltage at the rollback value of the output voltage, thus, when the output voltage decreases to a value equal to or less than the rollback value, the output of a comparator 69 goes high and generates a logic one for the Low signal. The Low signal causes the Sample signal to go high and start a re-sample operation. The high Sample signal stops CLK from propagating through gate 68 to suspend the light load mode operation and to initiate a re-sample operation of block 36. A counter 115 (see FIG. 2) causes the Sample signal to once again go low to stop the re-sample operation and to continue the light load mode of operation by enabling gate 68 and allowing the Clock signal to propagate through gate 68.

Block 63 receives the Low signal and forces the Up signal to a logic high through NOR gate 104 and inverter 105. On the next positive edge of the CLK signal, the logic one on the Low signal triggers one-shot 102. The pulse generated by one-shot 102 provides a pulse through gate 104 and inverters 103 and 105 to ensure that the Up signal stays at a logic one until the next positive CLK signal. Consequently, one-shot 102 is formed to have a pulse width that is greater than the period of the CLK signal. The output of one-shot 102 is inverted through inverter 103 and is used to form the Burst signal.

The Burst signal assists in rolling back the count of the drive pulse algorithm and decreasing the number of drive pulses removed from the set of time slots. The Burst signal is used to initiate another count of sixteen and to increment the count within counter 59. The Burst signal resets or clears counter 57 (FIG. 2) to all zeros through an inverter 71 and AND gate 67. The Burst signal also resets flop 76 (FIG. 3) through an inverter 87, a NAND gate 86, and an inverter 88. Resetting counter 57 to all zeros drives the Load signal high to load the count from counter 59 into counter 58. When the Burst signal goes high through inverter 103, the other input of gate 107 is low from the Q output of flop 108. The next positive edge of the CLK signal forces the C1 clock signal high through gate 99 and inverter 100. Since counter 57 cleared, the output of NOR gate 90 (FIG. 3) is high. Thus, the Load signal goes high through gate 91 and inverter 92 when CLK is high. Since the Up signal is a logic one, the positive going C1 signal is applied to counter 59 and increments counter 59. The following positive CLK edge forces the output of 108 low causing C1 to go low again. When the timing pulse from one-shot 102 expires, the Burst signal goes low removing the reset from flip-flop 76 and from counter 57.

Counter 57 now begins another set of 16 timing slots starting with a count of zero. As before, counter 57 increments on the negative edge of the CLK signal until reaching the count of fifteen that is stored in counter 58. On the negative clock edge that counter 57 rolls to a count of fifteen, the all ones from the output of counter 57 are applied to the CNT inputs of block 63. Comparator 61 also applies all ones to the CMP inputs of block 63. As in the previous discussion, the CNT inputs create a C1 clock signal. Because the Low signal is high, the Up signal is a logic one causing counter 59 to once again increment. However, counter 59 is already at a count of fifteen so it can't count higher and counter 59 remains at a count of fifteen. If the value stored in counter 59 were a number less than fifteen, counter 59 would increment by each positive going C1 signal and that new value would be loaded into counter 58 for the next set of sixteen time slots. This sequence would continue until counter 59 reached a value of fifteen. Since the CMP inputs are high, block 63 generates a positive going Blank signal on the next positive clock edge. The next negative clock edge increments counter 57 to zeroes which applies all zeros to the CNT and CMP inputs. The lows on the CNT inputs generate a positive going Load signal on the next rising CLK edge through gate 91. The Load signal loads the count of counter 59 into counter 58.

As long as the output voltage is less than the rollback value, this sequence continues with counter 59 loading a count of fifteen into counter 58 at the same point within the cycle. This sequence of repeating the count of fifteen until reaching the repeat number of repeats is referred to as the maximum rollback sequence.

During the light load mode, sample control block 110 may periodically suspend the algorithm in order to adjust the value of the stored error voltage on capacitor 38. Block 110 typically allows the algorithm to operate until the Low or Phi signal goes high causing a re-sample. A re-sample suspends the algorithm for a period of time referred to as the suspend time period. When controller 11 is in the normal operating mode, the LLL signal is low and block 110 is reset. An inverter 101 receives the low LLL signal and outputs a high signal to the input of a NOR gate 109. The output of gate 109 is then forced low which forces the output of inverter 106 high. The high output of inverter 106 holds an RS flip-flop or flop 113 in a reset state. A D-type flip-flop 114 is reset by the POR signal which previously has gone high. Counter 115 counts the number of CLK pulses after counter 115 is released from reset. The number of clock pulses sets the operating time period.

When the output voltage on output 14 increases pasts an upper limit, the output of comparator 49 goes high and initiates another sample period to refresh the sampled error voltage of sample-and-hold block 36. The upper limit of the output voltage is established by the fourth reference voltage Vref4. Typically the upper limit is about three percent greater than the desired output voltage. Sample control block 110 receives the high signal from comparator 49 which sets RS flip-flop 113 through NOR gate 111 and inverter 112. The next positive edge of the Clock signal is buffered through inverters 75 and 74 and latches the output of RS flop 113 into D flip-flop 114. The output of flop 114 drives the Sample signal high through a buffer 131 and starts a refresh of block 36. After the output voltage decreases below the upper limit, the sample period operation is continued by sample control block 110. The output of flop 114 allows counter 115 to begin counting negative Clock edges through inverter 70. Once the MSB of counter 115 goes high, typically eight clock edges, the output of NOR gate 109 goes low and the output of inverter 106 goes high. The high on the output of inverter 106 causes RS flop 113 to reset. On the next positive edge of Clock, the logic zero on the output of RS flop 113 is clocked into D flop 114 causing the Sample Signal to go low.

When a sample period is caused by a Phi signal, it is because the output voltage has become greater than a predetermined threshold. In the preferred embodiment, the predetermined threshold is when the output voltage increases to a value that is three percent (3%) greater than the desired value of the output voltage. This situation happens when the rollback algorithm has removed every other pulse and the load continues to decrease. A re-sample at this time causes the duty cycle to decrease in order to match the load required (since negative currents are not allowed in the inductor as previously described). Eventually the load may decrease to the point where some re-samples yield a zero percent (0%) duty cycle. This will cause node 27 to tri-state until the output voltage decreases below the rollback value (triggers the Low signal) causing a resample. This action further improves efficiency at extremely light loads by eliminating a greater amount of pulses. The zero percent (0%) duty cycle point generally is selected to occur at a point where the energy in inductor 21 is insufficient for generating audible noise by sizing capacitor 22. This operation safely improves efficiency through the "audible noise region" and further improves efficiency when the inductor energy is less than that region.

When the output voltage decreases below the rollback value, as described previously, the Low signal goes high. The Low signal enters Sample control block 110 as the second input to NOR gate 111. Thus, the Low signal causes a Sample Signal in the same manner as the output of comparator 49 described above.

FIG. 5 schematically illustrates a preferred implementation of light load reset block 62 that is shown in FIG. 2. Block 52 is formed to allow the rollback to repeat for a number of times equal to the repeat number. IN the preferred embodiment, the repeat number is three. In order to implement the maximum rollback sequence, the outputs of skip counter 58 are applied to an S input of block 62. If the output of counter 58 is all ones (count of fifteen) for three consecutive sets of sixteen, block 62 asserts the light load latched reset (LLLR) signal.

The consecutive sets are counted and stored by a D flip-flop 118, a D flip-flop 121, and a D flip-flop 124. The blank signal is used as a clock to sequentially clock the state of counter 58 into flops 118, 121, and 124. If the output of counter 58 is all ones for three consecutive blank signals then count of fifteen has been stored in counter 58 for three consecutive sets. The elements of block 62 detect this condition. The output of counter 58 is applied to the input of a NAND gate 116. The count of fifteen forces NAND gate 116 to apply a zero to a D input of flip-flop 118 through an inverter 117. The zero on the output of inverter 117 is applied to an input of a NAND gate 119 causing a zero to be applied to a D input of flip-flop 121 through gate 119 and an inverter 120. The zero on the output of inverter 120 applies a zero to an input of a NAND gate 122 causing a zero to be applied to a D input of flip-flop 124 through gate 122 and an inverter 123. The Blank signal drives the clock input of flip-flops 118, 121, and 124. A Q output of flop 124 is applied to a set input of a set-reset latch 125. A Q output of latch 125 drives the LLLR signal through an inverter 126 and an inverter 127. A Q output of flip-flop 118 is applied to another input of gate 119, and a Q output of flop 121 is applied to another input of gate 122. If the output of counter 58 is anything other than all ones (count of fifteen) when a blank signal occurs, then a zero is clocked into flip-flops 118, 121, and 124 simultaneously. Since the blank signal becomes active on the positive edge of the CLK signal, the positive edge of the third CLK signal drives the LLLR output high. The negative edge of the CLK signal resets latch 125 which drives the LLLR signal low. Consequently, the LLLR signal remains high for one-half of a CLK period. The inverted LLLR signal from the output of inverter 126 is applied to an input of a NAND gate 129. Since the other input of gate 129 is RST and RST is high, the output of gate 129 follows the LLLR signal. The output of gate 129 is applied to an input of inverter 130 and the output of inverter 130 is applied to an input of an inverter 131 which has an output connected to the reset input of flip-flops 118, 121, and 124.

When the LLLR signal goes high, logic and filter block 54 drives the LLL signal low. The low LLL signal is applied to an input of gate 72 (FIG. 2) which drives the RST signal low thereby preventing blocks 62 and 63 and counters 57 and 59 from operating and removing controller 11 from the light load mode.

In order to implement this functionality, an inverter 70 has an input connected to the Clock input of block 56 and an output connected to a first input of NOR gate 68. A second input of gate 68 is connected to the Sample output of block 110. An output of gate 68 is connected to an input of inverter 66 which has an output connected to the clock input of counter 57. The output of gate 68 is also connected to a CLK input of blocks 62 and 63. Inverter 73 has an input connected to the output of gate 72 and an output connected to a set input of counter 59, a reset input of block 62, a reset input of blocks 62 and 63, and a first input of AND gate 67. A second input of gate 67 is connected to an output of inverter 71, and an output of gate 67 is connected to a reset input of counter 57. An input of inverter 71 is connected to the Burst output of block 63. The PreBlank output of block 63 is connected to an input of an inverter 64 and an output of inverter 64 is connected to a first input of NOR gate 65. A second input of gate 65 is connected to the Sample output of block 110 and the output of gate 65 is connected to the Blank output of block 56. The Blank output of block 56 is connected to the Blank input of block 62. Comparator 69 has a positive input connected to the Vref2 output of reference 33, an inverting input connected to feedback input 29, and an output connected to the Low input of block 63.

Sample block 110 receives the CLK signal on an input of an inverter 101 and a clock (C) input of counter 115. An output of inverter 112 is connected to a set (S) input of flop 113. A Q output of flop 113 is connected to the data (D) input of flop 114, and the Q output of flop 114 is connected to the Sample signal output of block 110 and to a clock (C) input of counter 115. A reset input of flop 114 is connected to the POR input of block 56. A most significant bit output of counter 115 is connected to a first input of gate 109, a second input of gate 109 is connected to the LLL signal input of block 56 through inverter 74, and a third input of gate 109 is connected to the POR input of block 56 through inverter 93. The output of gate 111 is connected to the input of inverter 112. The output of inverter 112 is connected to the set (S) input of flop 113. The Phi input is connected to a first input of NOR gate 111 which has an output connected to a set bar input of D flip-flop 114 and to the input of inverter 112. The Low input is connected to a second input of NOR gate 111.

The inputs of gate 77 of block 63 are connected to the outputs of comparator 61, and the output of gate 77 is connected to an input of inverter 78 which has an output connected to a D input of flip-flop 76. A Q output of flip-flop 76 is connected to an input of inverter 79, to a first input of gate 97, and to the PreBlank output of block 63. An output of inverter 79 is connected to a first input of gate 84. An input of an inverter 82 is connected to the CLK input of block 56. An output of inverter 82 is connected to an input of an inverter 83 and to a second input of gate 97. An output of inverter 83 is connected to a second input of gate 84, a clock input of flip-flop 76, a first input of gate 91, a clock input of flip-flop 96, a clock input of one-shot 102, and a clock input of flip-flop 108. An output of gate 84 is connected to the C2 output of block 56. Gate 90 has inputs connected to the output of counter 57 and an output connected to the second input of gate 91. An output of gate 91 is connected to an input of inverter 92 which has an output connected to the load output of block 56. The inputs of gate 94 are connected to the output of counter 57, and the output of gate 94 is connected to an input of inverter 95. The output of inverter 95 is connected to the D input of flip-flop 96 and a Q output of flip-flop 96 is connected to a third input of gate 97. An output of gate 97 is connected to an input of inverter 98 which has an output connected to a first input of gate 99. A second input of gate 99 is connected to a first input of a gate 107 and to a Q output of flip-flop 108. An output of gate 99 is connected to an input of inverter 100 which has an output connected to the Cl output of block 56. The POR input of block 63 is connected to a first input of gate 86, a reset input of flip-flop 96, a reset input of one-shot 102, and a reset input of flip-flop 108. The Low input of block 63 is connected to an In input of one-shot 102, and to a first input of gate 104. An output of one-shot 102 is connected to an input of inverter 103 and to a second input of gate 107. An output of inverter 103 is connected to the Burst output of block 63, to a second input of gate 104, and to an input of an inverter 87. An output of inverter 87 is connected to a second input of gate 86 which has an output connected to an input of inverter 88. An output of inverter 88 is connected to a reset input of flip-flop 76.

The inputs of gate 116 are connected to the outputs of counter 58 and the output of gate 116 is connected to an input of inverter 117. The output of inverter 117 is connected to a D input of flip-flop 118 and to a first input of gate 119. A Q output of flip-flop 118 is connected to a second input of gate 119 and an output of gate 119 is connected to an input of an inverter 120. The output of inverter 120 is connected to a D input of flip-flop 121 and to a first input of gate 122. A Q output of flip-flop 121 is connected to a second input of gate 122 and an output of gate 122 connected to an input of inverter 123 which has an output connected to the D input of flip-flop 124. The Q output of flip-flop 124 is connected to an S input of latch 125. The Blank signal from block 63 is connected to a clock input of flip-flops 118, 121, and 124. The CLK signal is connected to an input of an inverter 128 which has an output connected to the R input of latch 125. A Q output of latch 125 is connected to an input of inverter 126 which has an output connected to an input of inverter 127 and to a first input of gate 129. An output of inverter 127 is connected to the LLLR output of block 62 and to the LLLR input of block 54. A second input of gate 129 is connected to the RST signal and an output is connected to an input of inverter 130. The output of inverter 130 is connected to a reset input of flip-flops 118, 121, and 124.

Figure 6:
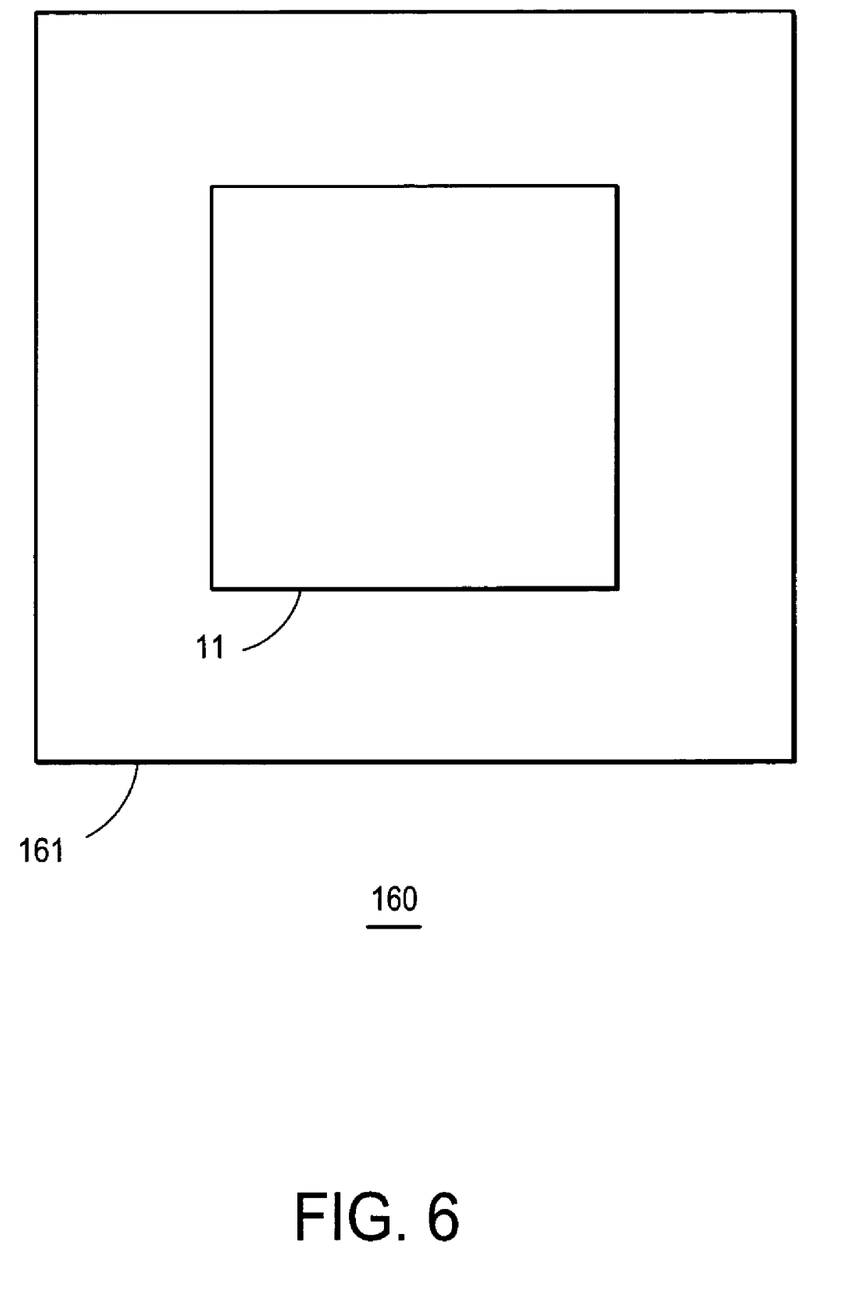
FIG. 6 illustrates an enlarged plan view of a portion of an embodiment of a semiconductor die on which the power supply controller of FIG. 2 is formed in accordance with the present invention.

FIG. 6 schematically illustrates an enlarged plan view of a portion of an embodiment of a semiconductor device 160 that is formed on a semiconductor die 161. Controller 11 is formed on die 161 by semiconductor processing techniques that are well known to those skilled in the art. Die 161 may also include other circuits that are not shown in FIG. 6 for simplicity of the drawing.

In view of all of the above, it is evident that a novel device and method is disclosed. Included, among other features, is forming a power supply controller to group drive pulses into sets and under certain conditions to remove some of the drive pulses from each set. It should be noted that the duty cycle of the drive pulses remain substantially constant. Removing only some of the drive pulses improves the efficiency of the power supply controller and reduces the audible noise created by the drive pulses.

While the invention is described with specific preferred embodiments, it is evident that many alternatives and variations will be apparent to those skilled in the semiconductor arts. More specifically the algorithm may be changed in various ways and still fall within the conception of grouping the drive pulses into sets and removing some of the drive pulses from each set. For example, the set may have various numbers of members instead of the sixteen described for the preferred embodiment. The set may even have a varying number of members from one set to the next set. For example, the set may have sixteen members in the first set and the next set may have thirty two members or eight members. Additionally, more or less than one drive pulse may be deleted for each new set or re-inserted for the rollback portion of the algorithm. For example, the first set may delete, or re-insert, two drive pulses and the second set may delete, or re-insert, five drive pulses. The sample-and-hold method may also be changed from using the value of the output voltage to trigger suspension of the algorithm to other methods. For example, the algorithm may be suspended when at certain time intervals such as a predetermined refresh rate.

The invention claimed is:

1. A method of operating a power supply controller comprising:
   organizing output drive pulses of the power supply controller to into a plurality of sets with each set of the plurality of sets having a plurality of timing slots for the output drive pulses;
   deleting a first drive pulse in a first set of the plurality of sets from a first timing slot when a load current of the power supply controller is less than a first current value;
   deleting, in a second set, the first drive pulse from the first timing slot and a second drive pulse from a second timing slot after the power supply controller has issued the first set;
   reinserting into a third set a first number of deleted drive pulses wherein the third set is issued subsequent to the second set; and
   reinserting into a fourth set a second number of deleted drive pulses wherein the fourth set is issued subsequent to the third set and wherein the second number is greater than the first number.

2. The method of claim 1 wherein deleting, in the second set, the first drive pulse from the first timing slot and the second drive pulse from the second timing slot includes keeping an error voltage of the power supply controller constant.

3. The method of claim 1 wherein deleting, in the second set, the first drive pulse from the first timing slot and the second drive pulse from the second timing slot includes deleting the first drive pulse from the first timing slot and deleting the second drive pulse from the second timing slot that is non-adjacent to the first timing slot.

4. The method of claim 1 wherein organizing the output drive pulses into the plurality of sets with each set of the plurality of sets having the plurality of timing slots includes forming each set with a same number of timing slots.

5. The method of claim 1 wherein organizing the output drive pulses into the plurality of sets with each set of the plurality of sets having the plurality of timing slots includes forming each set with a different number of timing slots.

6. The method of claim 1 wherein re-inserting into the third set the first number of deleted drive pulses includes re-inserting the first drive pulse into the first timing slot.

7. A method of forming a power supply controller comprising:
forming the power supply controller to organize output drive pulses into a plurality of sets with each set having a plurality of timing slots for the output drive pulses;
forming the power supply controller to delete a first number of drive pulses from respective timing slots in a first set of the plurality of sets when a load current of the power supply controller is less than a first current value; and
forming the power supply controller to delete in a second set both the first number of drive pulses plus a second number of drive pulses from respective timing slots in the second set after the power supply controller has issued the first set.

8. The method of claim 7 wherein forming the power supply controller to delete in the second set both the first number of drive pulses plus the second number of drive pulses includes forming the power supply controller to delete a first drive pulse from a first timing slot and a second drive pulse from a second timing slot.

9. The method of claim 8 wherein forming the power supply controller to delete the first drive pulse from the first timing slot and the second drive pulse from the second timing slot includes forming the power supply controller to delete the first drive pulse from the first timing slot and the second drive pulse from the second timing slot that is non-adjacent to the first timing slot.

10. The method of claim 7 wherein forming the power supply controller to organize the output drive pulses into the plurality of sets with each set having the plurality of timing slots includes forming the power supply controller to form each set with sixteen timing slots.

11. The method of claim 7 wherein forming the power supply controller to organize the output drive pulses into the plurality of sets with each set having the plurality of timing slots includes forming the power supply controller to form each set with a different number of timing slots.

12. The method of claim 7 further including forming the power supply controller to re-insert at least one deleted drive pulse into a third set responsively to an output voltage formed by the output drive pulses decreasing to a first voltage.

13. The method of claim 7 further including forming the power supply controller to delete all drive pulses from a set.

14. The method of claim 12 further including forming the power supply controller to sequentially increase the number of re-inserted drive pulse for each set subsequent to the third set responsively to the output voltage decreasing to a second voltage that is less than the first voltage.

15. The method of claim 7 further including forming the power supply controller to maintain an error voltage constant during each set of the plurality of sets.

16. The method of claim 7 wherein forming the power supply controller to delete the first number of drive pulses includes counting a first number of current reversals through an energy storage inductor to determine when the load current of the power supply controller is less than the first current value.

17. A power supply controller comprising:
an output coupled to drive an output transistor to provide a load current through an energy storage inductor to form an output voltage; and
a control block coupled to organize drive pulses to the output transistor into a plurality of sets having a plurality of timing slots for driving the output transistor wherein the control block provides a control signal to delete a first drive pulse in a first set of the plurality of sets from a first timing slot when the load current is less than a first current value wherein the control block is configured to increase the number of deleted drive pulses from each successive set of the plurality of sets so that each successive set has deleted more drive pulses than an immediately prior set.

18. The power supply controller of claim 17 wherein the control block coupled to organize drive pulses includes the power supply controller providing the control signal to delete a second drive pulse from a second timing slot in a second set of the plurality of sets after the power supply controller has issued the first set.

19. The power supply controller of claim 17 wherein the control block coupled to organize drive pulses includes the power supply controller configured to re-insert at least one deleted drive pulse when the output voltage decreases to a first voltage wherein each successive set includes more drive pulses that a set that was immediately prior.

20. The power supply controller of claim 19 wherein the control block coupled to organize drive pulses includes the power supply controller coupled to re-insert all deleted drive pulse when the output voltage decreases to a second voltage that is less than the first voltage.

* * * * *